United States Patent [19]

O'Neill

[11] 4,005,241

[45] Jan. 25, 1977

[54] METAL PLATED POLYMERIC ARTICLE

[75] Inventor: Francis J. O'Neill, Springfield, Mass.

[73] Assignee: Monsanto Company, St. Louis, Mo.

[22] Filed: Feb. 7, 1975

[21] Appl. No.: 547,889

Related U.S. Application Data

[63] Continuation-in-part of Ser. No. 301,448, Oct. 27, 1972, abandoned.

[52] U.S. Cl. .............................. 428/335; 428/462; 428/463; 428/920; 428/921; 260/876 R
[51] Int. Cl.$^2$ ................. B32B 25/16; B32B 15/06; B32B 15/08
[58] Field of Search .......... 428/323, 327, 328, 462, 428/463, 920, 921, 335, 461; 260/876 R, 880 R, 894, 42.32, 42.48

[56] References Cited

UNITED STATES PATENTS

| 3,561,995 | 2/1971 | Wu et al. | 428/409 |
|---|---|---|---|
| 3,563,783 | 2/1971 | Sukuma | 428/462 |
| 3,650,803 | 3/1972 | Lin | 428/462 |
| 3,669,714 | 6/1972 | Wiley | 428/462 |
| 3,830,889 | 8/1974 | Deets et al. | 260/876 R |
| 3,903,037 | 9/1975 | Deets | 260/876 R |

*Primary Examiner*—George F. Lesmes
*Assistant Examiner*—Charles E. Lipsey

[57] ABSTRACT

This invention relates to a metal plated polymeric article, and method for the preparation thereof. The polymeric material used to form the article comprises a polyblend of a styrene polymer blended with a grafted chloroprene rubber and an inorganic compound. The grafted chloroprene provides the styrene polymer with high impact strength and serves as a source of labile halogen for flame retardancy. The inorganic compound catalyzes the evolution of halogen providing fire retardant properties to the metal plated polymeric polyblend article.

5 Claims, No Drawings

4,005,241

METAL PLATED POLYMERIC ARTICLE

This application is a continuation-in-part of Ser. No. 301,448, filed Oct. 27, 1972, now abandoned.

BACKGROUND OF THE INVENTION

Polymeric materials of the styrene family including polystyrene and its copolymers, impact resistant polystyrene containing dispersed rubber phases as polyblends and more recently impact resistant copolymers and terpolymers of styrene have gained great commercial utility as tough engineering plastics. Such plastics appear as structural parts of appliances, automobiles and housing.

These structural parts may be metal plated for abrasion and corrosion resistance and for decorative finishes. The polymeric parts are lightweight, hence, the metal plated polymeric parts are more desirable than solid metal parts for many uses. It is recognized that metal plated plastics have some resistance to fire, however, the Underwriters Laboratory do not classify plated materials as fire-retarding or self-extinguishing unless the plastic itself is inherently self-extinguishing. If the plating fails or is not continuous the plastic article will burn. Further, when the part melts and the plastic breaks through the plating it will support combustion unless the plastic is self-extinguishing.

Many such plastic articles are not considered metal platable because the metal plating will not adhere to the plastic substrate. Stringent adhesion tests are required along with thermal cycling tests to determine if the plating is a functional plating and will not crack, blister or craze during use because of poor adhesion, It is the objective of this invention to provide particular polymeric articles of the styrene family which are metal platable and self-extinguishing providing great utility.

Government codes are requiring that such plastics be flame-retardant. The industry has developed may improved grades of such materials, however, with the ever greater need for high performance plastics, most fire retardant polymers have suffered from inadequate physical properties such as toughness and impact strength.

Polymers formulated with various additives in sufficient amounts to produce fire-retardant properties in the polymer may cause certain physical properties of the polymer to be seriously impaired. Flame-proofing materials such as the halogenated aliphatic and aromatic compounds which are compatible with the styrene polymer family of plastics often act as plasticizers and lower the modulus, reducing the tensile strength. Such materials are thought to decompose and provide a halogen gas-phase that inhibits the gas-phase combustion of the plastic.

Certain inorganic compounds, in particular metal oxide compounds when used in combination with the halogenated organic compound, appear to catalyze their decomposition or enter the chain of reactions to form metal halides that are effective flame retardants. Such system are not predictable in that many such combinations lower the melt point of the polymer causing it to pyrolyze more readily, hence, actually increasing flammability. Beyond flammability such combinations have caused the polymer systems to degrade during heat processing or on exposure to light.

Polymeric plasticizers containing halogens such as polyvinyl chloride and chlorinated olefins have been tried in an attempt to overcome the deficiencies of the lower molecular weight halogenated organic compounds. Such polymeric materials, however, as used in the styrene family of plastics have lowered their heat stability during processing and given lower physical properties particularly lower modulus, heat distortion and impact strength.

The above problems have been overcome in the styrene family of impact polymeric polyblends by the present invention of incorporating a particular grafted chloroprene rubber that will provide both self-extinguishing properties and metal platability along with impact strength and toughness. It has been further discovered that the chloroprene rubber when used in combination with certain metal oxides in the polyblends gives even further improvement in self-extinguishing properties.

SUMMARY OF THE INVENTION

The present invention relates to a metal plated polymeric article and more particularly to a metal plated article of manufacture wherein the polymeric article is molded from a polyblend composition comprising:

A. a polymer of a monovinylidene aromatic monomer and an ethylenically unsaturated nitrile monomer wherein the ethylenically unsaturated nitrile monomer moiety constitutes from 0% to about 90% by weight of the polymer;

B. from 15 to 40% by weight, based on the total weight of the polyblend, of a crosslinked polychloroprene rubber having a Mooney viscosity of at least 200 (MS-2½ min., 212° F.), which is grafter with:
 1. at least one monovinylidene aromatic monomer; and
 2. an ethylenically unsaturated nitrile monomer; wherein the ethylenically unsaturated nitrile monomer moiety constitutes from 0% to about 90% by weight of the grafted polymer;
 wherein the percent graft of aromatic monomer and nitrile monomer onto the polychloroprene rubber is in the range of from 10 to 100% by weight, based on the weight of the polychloroprene rubber; and C. from 1 to 15% by weight, based on the total weight of the polyblend of an inorganic compound selected from the group consisting of $Sb_2O_3$, $Bi_2O_3$, $MoO_3$, $SnO_2$, $WO_3$, and mixtures of the same;
wherein the total amount of polymer formed from the vinylidene aromatic monomer and the unsaturated nitrile monomer in the polyblend composition is in the range of from 45 to 84% by weight, based on the total weight of the polyblend.

The present invention also relates to a method for producing a metal plated article of the styrene family by blending uniformly a mixture of a styrene polymer with a grafted chloroprene rubber and a metal oxide followed by forming and plating said article.

DESCRIPTION OF THE PREFERRED EMBODIMENTS

As employed herein, the term polyblend means a mechanical mixture of polymers. In the present invention the grafted chloroprene rubber phase is dispersed or polyblended into the polystyrene or polystyrene copolymer phase by the conventional means. The metal oxides are also incorporated in this same mixture and dispersed in the polymer phase. Melt working and mixing is conventionally carried out by those skilled in the art, through extrusion, milling or banburying for example, wherein the styrene polymer phase reaches a melt temperature of 400° to 450° F. Other additives may be present in the melt, e.g., antioxidants, lubricants and pigments.

Such polystyrene polyblends have the rigidity and modulus of the polystyrene or polystyrene copolymer phase. The grafted chloroprene rubber phase exists as small rubber particles that provide the polyblend with much higher impact strength than the rigid polymeric phase can provide as a single phase. Such rubber particles are considered to be stress relieving centers that give the polyblend high impact strength, greater elongation at fail under stress and greater toughness without serious loss of modulus or rigidity in the outer phase.

The grafted chloroprene rubber is a product of polymerization wherein at least one monovinylidene aromatic monomer and/or ethylenically unsaturated nitrile monomer is polymerized in the presence of chloroprene rubber. The polymerization reaction causes the monomers to polymerize as polymer and as copolymer chains attached to the rubber molecule forming a grafted polychloroprene rubber.

The monovinylidene aromatic monomers used in the polymers making up the polyblends of this invention include styrene, aralkylstyrenes, e.g., o-, m-, and p-methylstyrenes, -ethylstyrenes, -isopropylstyrenes, -butyl-styrenes, -tertiary butylotyrenes, various alphaalkylstyrenes, e.g., methyl-styrenes, ethylstyrenes, various arhalostyrenes, e.g., o-, m-, and p-chlorostyrenes, bromostyrenes, fluorostyrenes; various di, tri, tetra and penta substituted chlorostyrenes, bromostyrenes and fluorostyrenes and various alpha- and beta-halosubstituted styrenes, e.g., alphachlorostyrenes, alpha-bromostyrenes, betachlorostyrenes, betabromostyrenes, and alpha, beta-halosubstituted and the like.

The ethylenically unsaturated nitrile monomers used in the polymers of this invention are e.g., acrylonitrile, methacrylonitrile, ethacrylonitrile, methyl methacrylonitrile and the like with acrylonitrile and methacrylonitrile and the like being preferred.

Either of the vinylidene aromatic monomer or the ethylenically unsaturated nitrile monomer can be used in major proportions relative to one another in copolymerization or grafting. For example, styrene and acrylonitrile will copolymerize with the preferred ratio of styrene to acrylonitrile (S/AN) being about 75% S to 25% AN or the azeo-tropic mixture of the two which gives a uniform copolymer. These ratios can be varied from 95/1 to 1/95, S/AN, with certain polymerization methods to give polymers that have great utility.

In applications that need properties such as gas impermeability, light stability, toughness, etc., it is preferred to have a polymer with a nitrile monomer content in amounts of from 20 to 70% by weight with the monovinylidene aromatic monomer content in corresponding amounts of from 80 to 30% by weight based on the weight of the monovinylidene aromatic monomers and unsaturated nitrile copolymer. For other applications where the fabricated part needs greater plasticity, composition containing a major portion of the monovinylidene aromatic monomer is preferred, e.g., up to 90 weight percent. The monovinyl aromatic monomer may be halogensubstituted providing a halogen source for flame retarding and can be used in major proportions in the present invention, e.g., 20 to 80 weight percent.

The polyblends of the present invention contain from 45 to 84% by weight, based on the total weight of the polyblend of polymer formed from the vinylidene aromatic monomer and the unsaturated nitrile monomer. This polymer component is present in the form of polymer grafted onto the rubber substrate and as ungrafted polymer.

The rubber component of the polyblend may be polychloroprene or copolymers of chloroprene and minor amounts of other monomers, e.g., butadiene, acrylonitrile, methacrylonitrile, styrene, arhalostyrene, alphahalostyrenes, aralkylstyrenes, alphaalkylstyrenes, vinyl chloride; or mixtures of polychloroprene and other synthetic or natural rubbers, e.g., polybutadiene, butadiene styrene copolymer, isoprene, nitrile rubbers, acrylate rubber, butadiene-styrene-acrylonitrile terpolymers, chloroprene-butadiene-styrene terpolymers, chloroprene-butadiene-acrylonitrile terpolymers, halogenated rubbers and the like.

Chloroprene rubbers are commercially available as Neoprene from E. I. duPont de Nemours and Company as solid rubbers or rubbers contained in emulsions. The generally preferred rubbers are colorless, have good heat stability for processing and are soluble or dispersible in the monovinylidene aromatic and ethylenically unsaturated nitrile monomers either in combination or singly. A polymerizing mixture of polychloroprene, styrene and acrylonitrile, etc., wherein the rubber is in solution or dispersed in the reacting monomers will polymerize causing the monomers to graft onto the polychloroprene rubber molecules as grafted chains to form an interpolymer or grafted chloroprene rubber. As the polymerization progresses a copolymer of styrene and acrylonitrile (SAN) is also formed in the reacting mixture. As the SAN phase becomes larger than the grafted phase the rubber phase will invert to become the internal phase as a dispersed grafted rubber particle in SAN. Under agitation this dispersion becomes a uniform dispersion or polyblend of grafted chloroprene rubber in SAN polymers. Such polyblends have much greater impact strength than the rigid SAN phase alone. In the present invention the grafted chloroprene provides the novel combination of not only improving the impact strength of the larger SAN phase but also causing the SAN polyblend to be flame retardant and self-extinguishing.

The chloroprene rubbers contained in emulsion are readily grafted by dispersing the reacting monomers in the emulsion and grafting such monomers to the rubber much as in the case of the solution polymerization system.

The percent graft is a controlled amount and can be varied from about 10 to 100% depending on the weight average particle size of the rubber and the properties desired. The percent graft is defined as the weight percent of monomers grafted to the rubber particle based on the weight of the rubber, e.g., 100 grams of rubber grafted with 100 grams of monomers has 100% by weight of grafted monomers.

The weight average particle size of the rubber is selected to provide a balance of good physical properties such as impact strength and gloss. In the emulsion polymerization systems a rubber particle size from about 0.01 to 0.35 microns is preferred with about 0.05 to 0.20 microns being most preferred to give the polyblend desirable impact strength and high gloss. Being small in particle size they do not lower molded surface gloss. This size rubber particle is grafted in a preferred range of 10 to 100% by weight with 30 to 60% being most preferred to insure compatibility and insure good gloss. A larger weight average rubber particle with a size of from about 0.40 to 1.5 microns being preferred and from 0.50 to 1.0 microns being most preferred is polyblended with the small rubber particles to further increase the impact strength. The larger rubber particle is grafted in the preferred range of from about 5% to 40% by weight with 10% to 30% being most preferred to insure compatibility and maintain the integrity and particularity of the rubber particle.

Preferably, the polyblend has from about 50% to 97% by weight, most preferred 70% to 90% by weight, of the total weight of the grafted rubber, in the polyblend, in the form of smaller grafted rubber particles and correspondingly and preferably about 3% to 50% by weight, most preferred 10% to 30%, of the larger grafted rubber particles insuring a balance of good gloss and impact strength.

Preferably, the polyblend contains from about 15 to 40% by weight, of chloroprene base on the total polyblend to insure self-extinguishing properties for the combination. The grafted rubber must be present, in the polyblend, in a preferred amount of from about 16.5% to 80% by weight, most preferred about 16.5% to 70%, of the polyblend considering that the graft level can be from about 10% to 100% by weight of the chloroprene rubber.

Polyblends using grafted chloroprene rubber may also be prepared having good gloss and impact strength by selecting an optimum single mode weight average grafted rubber particle size rather than a polymode of small and large rubber particles. This can be accomplished by selecting rubber particles having a preferred weight average particle size of about 0.4 to 1.0 microns, most preferably about 0.5 to 0.8 microns, and grafting to a higher level preferably from about 10 to 100%, and most preferably from about 15% by weight based on rubber.

A further refinement of the polyblend system is used to insure good physical properties such as gloss and impact strength. The degree of graft stabilizes the rubber particle insuring its particulate character so that it stays dispersed in the polyblend and does not agglomerate under the heat and shear of melt colloiding and processing. The chloroprene rubber is preferably chemically crosslinked to further maintain this particulate property. The most preferred chloroprene rubber used in the emulsion graft systems are crosslinked and contain a medium to high gel content being extremely viscous having a Mooney viscosity about at least about 200 (MS-2½ min. 212° F.). These rubber latices are sold by the duPont Company as Neoprene Latices, e.g., Neoprene 842A.

It has been further discovered that high impact, self-extinguishing polyblends using grafted chloroprene rubbers can have their physical properties further enhanced by blending in small amounts of grafted polybutadiene rubbers to increase low temperature impact properties. Chloroprene rubbers have a second order transition temperature (Tg by ASTM Test D-746-52T) of about −40° C. and become brittle as this temperature is approached in use. The polyblends lose impact strength as the polyblend reaches this temperature range because the grafted rubber particles of the polyblend become brittle can no longer absorb stress. Polybutadiene rubbers have a lower Tg, in particular, the high cis-type polybutadiene rubbers have a Tg range of from about −50° to −105° C. with a preferred range of from about −75° to −95° C. Such rubbers are grafted with monovinylidene aromatic monomers (e.g. styrene) and/or ethylenically unsaturated nitrile monomers, e.g., acrylonitrile or methacrylonitrile and are functional and compatible with the polyblends of this invention.

It has been discovered that a small amount of grafted crosslinked polybutadiene rubber used in combination with a highly grafted small particle size chloroprene rubber (i.e. 0.01 to 0.35 micron) increases the impact strength of the polyblend. The grafted polybutadiene rubber particle has a preferred weight average size of from about 0.7 to 4.0 microns and most preferred 0.8 to 1.2 microns, and has a graft level of from 50 to 150% by weight using the same monomers and proportions thereof which are used with the polychloroprene rubber component. Such blends have a high gloss, in the range of 50 to 70 by the Hunter Gloss Meter. The amount of grafted polybutadiene rubber used is in the range of from 0.5% to 5% preferably 1 to 3% by weight of polybutadiene rubber based on the total weight of the polyblend.

It is further critical to the present invention to have present in the polyblend at least about 1% by weight of the polyblend of an inorganic compound with the preferred range of about 1% to 15% and the most preferred amount being about 5% to 10%.

The inorganic compounds preferred are certain metal oxides, e.g., $Sb_2O_3$, $Bi_2O_3$, $MoO_3$, $SnO_2$, $WO_3$, and the like. The most preferred being $Sb_2O_3$.

The following examples are presented in illustration of the present invention and are not intended in any way to limit the scope or spirit thereof.

TEST PROCEDURES

Underwriter's Laboratory Subject No. 94 Test

Flame retardant properties were measured using the above test which is carried out on test specimen 6 inches × ½ inch × ⅛ inch as follows:

The test specimen is supported from the upper end, with longest dimensions vertical, by a clamp on a ring stand so that the lower end of the specimen is ⅜ inch above the top of the burner tube. The burner is then placed remote from the sample, ignited, and adjusted to produce a blue flame ¾ inch in height.

The test flame is placed centrally under the lower end of the test specimen and allowed to remain for 10 seconds. The test flame is then withdrawn, and the duration of flaming or glowing combustion of the specimen noted. If flaming or glowing combustion of the specimen ceases within 30 seconds after removal of the test flame, the test flame is again placed under the specimen for 10 seconds immediately after flaming or glowing combustion of the specimen stops. The test flame is again withdrawn, and the duration of flaming or glowing combustion of the specimen noted.

If the specimen drips flaming particles or droplets while burning in this test, these drippings shall be allowed to fall onto a horizontal layer of cotton fibers (untreated surgical cotton) placed one foot below the test specimen. Significantly flaming particles are considered to be those capable of igniting the cotton fibers.

The duration of flaming or glowing combustion of vertical specimens after application of the test flame, average of three specimens (6 flame applications) shall not exceed 25 seconds (maximum not more than 30 seconds) and the portion of the specimen outside the clamp shall not be completely burned in the test.

Materials which comply with the above requirements and do not drip any flaming particles or droplets during the burning test will classify as "self-extinguishing Class I".

Materials which comply with the above requirements, but drip flaming particles or droplets which burn only briefly during the test will classify as "self-extinguishing Class II".

Class SE-O is given to materials wherein the duration of flaming or glowing combustion averages less than 5 seconds under the conditions above.

Flammability of Plastics Using the Oxygen Index Method

ASTM Test D-2863 is used with the General Electric Flammability Index Tester Model A-4990-A. A sample bar ⅛ inch × ½ inch × 5 inch is molded and placed in the above tester. The tester is attached to an oxygen tank and a nitrogen tank. By means of control valves, an atmosphere can be created inside the tester containing any desired ratio of nitrogen to oxygen. The lower the oxygen concentration which will support combustion, the higher the degree of flammability of the test specimen. It is generally considered that the oxygen content should be at least 20% for combustion support in order for a material to be considered sufficiently flame resistant. Of course, the higher the value, the better. A propane torch flame is applied to one end of the test specimen in the tester. If the specimen burns for at least 3 minutes, the concentration of oxygen is reduced. By a system of trial and error with several specimens the limiting oxygen concentration is determined where burning will just be supported for at least 3 minutes, but will not be supported at an oxygen concentration 1% lower. This limiting concentration is then reported as the Limiting Oxygen Index (LOI).

Weight Average Particle Size Test

The weight average particle size is determined by dispersing the polyblend in dimethylformamide using 2 grams of polyblend in 98 grams of solvent. The dispersion is then diluted 3 to 1 with methyl-ethyl-ketone and analyzed according to the published procedure of Groves, M. J., Kay, B. H., Scarlett, B., "Size Analysis of Subsieve Powders Using A Centrifugal Photo-sedimentometer", British Chemical Engineering, Vol. 9:742–744 (1964). A Model 3000 Particle Size Analyzer available from Martin Sweets Company, 3131 West Market St., Louisville, Ky. was used.

Impact Strength Test

ASTM Test D-256 – Method A commonly known as the Izod Test. Impact values are a measure of toughness and high values are needed for engineering applications preferably greater than 1.5 ft. lbs./in.

Heat Distortion Temperature Under Load

ASTM Test D-648 was used with a load of 264 psi. Test values here should remain high so that the polyblend is functional at high temperatures in engineering applications, e.g., automotive and appliances.

Graft Level Test

Weigh out 1 gram of grafted resin and disperse in 20 ml of a solvent of 50/50 dimethylformamide/methyl ethyl ketone. The matrix polymer will dissolve. Centrifuge and decant off the solvent. Repeat the process three times and dry the grafted rubber under vacuum and weigh.

$$\% \text{ Graft} = \frac{\text{wgt. of grafted rubber} - \text{wgt. of rubber} \times 100}{\text{wgt. of rubber}}$$

Sample Preparation

The plastic to be tested is usually in comminuted form. A portion of the plastic particles are compression molded at 330° –360° F. at 7200 psi to form a sheet about ⅛ inch thick. Sample bars are then cut from the molded sheet having dimesions of ⅛ inch × ½ inch × 6 inch.

Embodiments

Samples of polyblend polymers are prepared using ungrafted and grafted chloroprene rubber to demonstrate the properties of the two types and their ability to provide self-extinguishing properties and impact strength to the styrene family of polymers. Other pertinent physical properties are measured such as the heat distortion under load and gloss.

EXAMPLE 1

CONTROL

A typical polyblend of styrene-acrylonitrile copolymer (SAN) containing about 25% AN and a grafted polybutadiene rubber grafted with a 75/25 S/AN ratio of monomer is used. The polyblend containing about 23% rubber and about 77% SAN by weight, is available from the Monsanto Company of St. Louis, Mo., as Lustran ABS 740. The impact strength is 5.0 ft. lbs./in. at 73° F.; the percentage of oxygen that just supports combustion is 18% (LOI) and will not pass the UL 94 test. Those skilled in the art would recognize that this polyblend has a desirably high impact strength but that it is too low in flame retardancy for such uses. The grafted rubber than has the necessary compatibility to reinforce the polyblend to give high toughness.

EXAMPLE 2

CONTROL

A polyblend with SAN copolymer (Monsanto Company LNA 21) is prepared using 65 parts SAN polymer, 30 parts of solid chloroprene rubber (duPont Neoprene W) and 5 parts of $Sb_2O_3$. The polyblend is colloided on a Bolling roll mill using 130 psi steam pressure to reach a melt temperature of 400° –450° F. for 5 minutes after which the polyblend is stripped from the mill, cooled and comminuted. Test samples were prepared, The UL 94 test gives values of SE-O showing the polyblend is self-extinguishing. The impact strength test gives an Izod of less than 0.5 ft. lbs./in. demonstrating that ungrafted chloroprene that is both a noncrosslinked and ungrafted rubber lacks the necessary compatibility with the rigid phase SAN copolymer to produce a tough polyblend.

EXAMPLE 3

CONTROL

A polyblend is prepared by first blending an emulsion of a SAN copolymer with an emulsion of chloroprene rubber (duPont Latex 842-A sold by E. I. duPont Company of Wilmington, De. and coagulating with aluminum sulfate to form a crumb having 40% rubber and 60% SAN. The emulsion SAN copolymer is prepared using the following formulation based on parts per 100 parts of total monomers.

| | |
|---|---|
| Styrene | 70 |
| Acrylonitrile | 30 |
| Water | 116 |
| Potassium Persulfate | 0.005 |
| Terpinoline | 0.003 |
| Rubber Reserve Soap (Emery Industries of Cincinnati, Ohio. Sodium salt of oleic, stearic and palmitic acids) | 0.018 |
| Darvan No. 1 (Sodium salt of a formaldehyde naphthalene sulfonate sold by Dewey and Almy of Cambridge, Mass.) | 0.005 |

The monomers are dispersed in water containing the soap and Darvan and polymerized at 95° C. under reflux for 3 hours and 45 minutes in the presence of the potassium persulfate and catalyst and the terpinoline modifier under agitation. The emulsion contains 46.3% of SAN polymer in the emulsion.

The average particle size of the rubber particles in the chloroprene rubber latex and the polyblend is observed to be about 0.12 microns (weight average based on centrifugal photo sedimentation method).

The crumb is mechanically blended with a SAN copolymer (Monsanto LNA 21 sold by Monsanto Company of St. Louis, Mo. and tested as in Example 2 with the blend having 30 parts chloroprene rubber, 65 parts SAN polymer and 5 parts $Sb_2O_3$. The Izod test values are 1.5 ft. lbs./in. The UL-94 test have SE-O values. The percentage of oxygen to support combustion is 25.1% (LOI) and the heat distortion under load at 264 psi is 195° F. It is evident that the polyblend is self-extinguishing; has flame retardancy; has a high heat distortion temperature and has a higher degree of toughness because the rubber is crosslinked. The emulsion blending does provide a better polyblend than that of Example 2 having a impact strength of 1.5 ft. lbs./in. versus 0.5 ft. lbs./in. for a blend of solid rubber and copolymer wherein the rubber is not crosslinked.

| | |
|---|---|
| Chloroprene Rubber (duPont Latex 842 A 50% solids) | 100 |
| Styrene Monomer | 28 |
| Acrylonitrile Monomer | 12 |
| Emulsifying Agent (Dowfax 2A1) (Dowfax 2A1, a sodium salt of an alkyl diphenyl oxide sulfonate sold by Dow Chemical of Midland, Michigan) | 1 |
| Potassium persulfate initiator | 1 |
| Terpinoline Modified | 0.5 |
| Water | 260 |

The chloroprene latex, water, Dowfax and terpinoline are added to a stirred reactor and brought to 85° C. The monomers and initiator are added to the reaction over a period of 2 hours with a final finishing period of 1½ hours to give a latex having a solids level of 35%. The average particle size of the rubber particles in the latex is observed to be about 0.12 microns (weight average based on centrifugal photo sedimentation method). A grafted chloroprene rubber is formed along with SAN copolymer. The resulting latex is further blended with the SAN latex of Example 3 and coagulated using aluminum sulfate to recover the solid polyblend. Analysis of the polyblend shows the blend to be 30% polychloroprene having 14.4 weight percent of SAN grafted based on rubber; 65% SAN polymer including the grafted SAN. The blend is further melt colloided on a mill as in Example 2 with 5% $Sb_2O_3$ and the comminuted polyblend tested. The Izod impact strength is 4.4 ft. lbs./in; the heat distortion temperature under load is 191° F.; the UL-94 test values are Se-O and the percentage oxygen to support combustion is 25.6% (LOT). It is evident that the grafted chloroprene provides the polyblend with high impact strength or toughness; self-extinguishing properties and high flame retardancy without sacrificing the heat distortion temperature for functional engineering uses.

EXAMPLE 5

Example 4 is repeated running to a total lower conversion of 75% wherein the SAN graft level on the chloroprene rubber is 11.4% by weight based on rubber. The final polyblend admixture contains 30% chloroprene, 65% SAN polymer and 5% $Sb_2O_3$ as in Example 4. The admixture is melt colloided as in Example 2 and the comminuted polyblend tested. The Izod impact strength is 2.3 ft. lbs./in. showing a lower level of toughness when the graft level is lower and provides lower interaction with the rigid SAN phase but higher than the ungrafted chloroprene rubbers of Example 1 and 2. The US-94 test gives values of SE-O showing the polyblend to be highly self-extinguishing. The percentage oxygen to support combustion is 25.3% (LOI) showing high flame retardancy and the heat distortion temperature under load is 197° F. showing the polyblend is self-extinguishing and tough without sacrificing the heat distortion temperature under load is 197° F. showing the polyblend is self-extinguishing and tough without sacrificing the heat distortion temperature for functional engineering uses.

EXAMPLE 6

A higher grafted chloroprene is prepared by using the following formulation based on parts per 100 parts of total monomers:

| | |
|---|---|
| Styrene | 70 |
| Acrylonitrile | 30 |
| Chloroprene Rubber (duPont Latex 842A 50% solids) | 100 |
| Terpinoline | 1 |
| Darvan No. 1 | 1 |
| Potassium Persulfate | 1 |
| Rubber Reserve Soap | 1 |
| Water | 270 |

The Darvan No. 1 is added to the water and the chloroprene rubber latex then dispersed followed by the monomers and the catalyst. The monomers and catalyst are added at 25 parts per hour on 70/30 ratio basis with proportionate amounts of catalyst over a 4 hour period. The Rubber Reserve Soap is added after one half of the monomers have been added. The polymerization is carried out at 85° C. under agitation to give a latex with about 35% final solids. A grafted chloroprene rubber is formed along with SAN copolymer. The resulting latex is further blended with the SAN latex of Example 3 and coagulated using aluminum sulfate to recover the solid polyblend. The average particle size of the rubber particles in the polyblend are observed to be about 0.12 microns (weight average). The SAN graft on the chloroprene rubber is 48.0% by weight based on rubber. The final polyblend admixture contains 30% chloroprene, 65% SAN polymer and 5% $Sb_2O_3$ as in Example 4. The admixture is melt colloided as in Example 2 and the comminuted polyblend tested. The Izod impact is 0.8 ft. lbs./in. showing low impact values and toughness; the UL-94 test shows values of SE-O as self-extinguishing; and the heat distortion under load is 170° F. showing loss of heat distortion. It is evident that too high a level of grafting on the small chloroprene rubber particles lowers toughness.

EXAMPLES 7, 8, 9 and 10

Latex blends of lower graft and higher graft polychloroprene rubber are made using the grafted rubbers of Examples 4 and 6 as low and high respectively to give blends that have 30% chloroprene rubber by weight. These blends are in turn blended with SAN latex as in Example 3. The final admixtures were made to have the following compositions as tabulated below along with the physical tests of each composition. The Peak Hunter Gloss values are determined by measuring the gloss of a molded sample on a Hunter Laboratory Model D-36 Glassmeter supplied by Hunter Associates of McLean, Va.

EXAMPLES

|  | Ex. 7 | Ex. 8 | Ex. 9 | Ex. 10 |
|---|---|---|---|---|
| Low Graft Rubber | 30 | 15 | 9 | 0 |
| High Graft Rubber | 0 | 15 | 21 | 30 |
| SAN polymer | 65 | 65 | 65 | 65 |
| Antimony Oxide | 5 | 5 | 5 | 5 |
| Izod Impact Strength | 4.4 | 3.1 | 2.7 | 0.8 |
| HDTUL (264 psi) | 191 | 182° F. | 182° F. | 176 |
| UL-94 | SE-O | SE-O | SE-O | SE-O |
| Peak Hunter Gloss | 0 | 4 | 23 | 64 |

It is evident from the test values that low graft chloroprene rubbers can upgrade the high graft chloroprene rubbers to a high level of toughness bringing them from about 0.8 ft. lbs./in to levels of toughness over 1.5 ft. lbs./in. generally accepted for impact polyblends. It is also evident that the gloss level for the high graft rubber types is higher than for the low graft rubbers.

EXAMPLES 11 – 15

Rubber Particle Size Parameters

The chloroprene latex is observed to have an average rubber particle size of about 0.12 microns (weight average). The latex is agglomerated to give larger particles for testing as in Examples 4–10. Agglomeration is carried out according to the following procedures using:

| Chloroprene Rubber (duPont Latex 842A 25% solids) | 100 pts. |
|---|---|
| Emulsifying Agent (Dowfax 241) | .045 pts. |
| Acetic Anhydride | 6 pts. |
| Water | 300 pts. |

Dissolve 6 parts of the acetic anhydride in 60 ml of water and add to the rubber latex containing the Dowfax. Stir for 30 seconds after addition and let stand 30 minutes. Add 2 pts. of Dowfax to the emulsion to stabilize the emulsion. The average particle size of the rubber particle is observed to be about 0.05 microns (weight average).

The above emulsion is then grafted according to the procedure of Example 6 using varying amounts of terpinoline and catalyst to vary the conversion and percent graft. The grafted rubber emulsion is then processed into a polyblend and tested as in Example 6.

EXAMPLES

|  | 11 | 12 | 13 | 14 | 15 |
|---|---|---|---|---|---|
| Catalyst | 1.0 | 1.0 | 1.5 | 1.0 | 1.0 |
| Terpinoline (parts) | 1.0 | 0.5 | 0.0 | 0.0 | 0.5 |
| Graft level (wgt. %) | 2.5 | 8.9 | 15.0 | 21.9 | 27.3 |
| % Conversion | 64 | 77 | 85 | 99 | 82.0 |
| Wgt. % rubber | 30 | 30 | 30 | 30 | 30 |
| Wgt. % SAN | 70 | 70 | 70 | 70 | 70 |
| Wgt. % $Sb_2O_3$ | 5 | 5 | 5 | 5 | 5 |
| Izod Impact | 2.3 | 2.3 | 2.3 | 2.9 | 1.5 |
| Hunter Gloss | 23 | 41 | 49 | 50 | — |
| HDTUL ° F. | 183 | 180 | 185 | 185 | 177 |
| UL-94 | SE-O | SE-O | SE-O | SE-O | SE-O |

The data show that the percent graft can be varied from about 2.5 to about 30% with an average chloroprene rubber particle size of about 0.5 microns (wgt. average) before impact strength begins to drop with the gloss improving as the weight % graft increases. It is also evident that these low graft rubbers having an average particle size of about 0.50 microns have reasonably high gloss compared to low graft chloroprene rubbers of Examples 4–5, having an average rubber particle size of about 0.12 microns. This would indicate that the smaller rubber particle size rubbers provide much greater surface area for grafting, hence, are effectively less grafted and can agglomerate to give larger particles to improve impact strength but then lower gloss. Regardless of the theory the percent graft should be adjusted relative to particle size to provide both good impact strength and gloss within the parameters shown. In addition, it is observed that the heat distortion is high and polyblends have excellent self-extinguishing properties.

EXAMPLES 16 – 17

Examples 7–10 are repeated using a blend of high graft rubber of Example 6 having an average rubber particle size of about 0.12 microns and a graft level of 48.0 weight percent and the low graft rubber of Example 13 having an average rubber particle size of about 0.5 microns and a graft level of about 15.0 weight percent. The test results are:

|  | Example 16 | Example 17 |
|---|---|---|
| Wgt. % Low Graft Rubber | 3 | 6 |
| Wgt. % High Graft Rubber | 27 | 24 |
| Wgt. % SAN Polymer | 70 | 70 |
| Wgt. % $Sb_2O_3$ | 5 | 5 |
| Izod Impact Strength | 2.1 | 2.4 |
| Hunter Gloss | 45 | 60 |
| HDTUL | 176 | 178 |
| UL-94 | SE-O | SE-O |

The test data show high impact polyblends can be produced using 10 to 20% by weight of low graft chloroprene rubber having a particle size in the range of about 0.50 microns with 80% to 90% of a high graft chloroprene rubber having rubber particles in the range of about 0.12 microns. Also, the gloss of such blends has high values along with other good heat distortion temperatures and excellent self-extinguishing properties.

EXAMPLE 18

Part A

Fourteen parts of a soluble butadiene rubber were dissolved in 26.0 parts of acrylonitrile and 60.0 parts styrene. There were added thereto 0.07 part of a mixture of terbutyl peracetate 0.05 part di-tert-butyl peroxide and stabilizers. The mixture was heated to 100° centigrade with stirring. Terpinolene was added as a chain transfer agent over a period of approximately 5 hours in an amount of about 0.1 part per hour for approximately 5 hours, at the end of which time an additional 10.4 parts were added.

At 30.0 percent conversion of the monomers, the partially polymerized syrup was dispersed in 120.0 parts water to which was added 2.0 parts styrene and, as a suspending agent, 0.3 part of an interpolymer of 95.5 mol percent of acrylic acid and 4.5 mol percent of 2-ethylhexylacrylate which has a specific viscosity of about 4.0 as determined in a 1.0 percent solution in water at 25° centigrade. The resulting suspension was stirred and heated to polymerize the remaining monomer, cooled, centrifuged, washed and dried to recover the graft copolymer in the form of small spherical beads. The ratio of superstrate to substrate was about 0.9 to 1.0:1.0, and the particle size was about 0.9 micron.

Part B

Seventy grams of beads from Part A are milled and melt colloided as in Example 2 with the 930 grams of the final polyblend admixture of Example 6. The final polyblend now contains about 1% of polybutadiene rubber. The milled polyblend is comminuted and tested.

Part C

Using the above procedure 210 grams of Part A were colloided with 790 grams of the final polyblend of Example 6. The final polyblend now contains about 3% polybutadiene rubber. The milled polyblend is comminuted and tested. The test data on the two polyblends B and C are shown below.

| Polyblend | UL 94 Test | Impact Test | HDLT Test | Gloss Test |
|---|---|---|---|---|
| Part B | SE-O | 2.5 ft.lbs. | 187° F. | 70 |
| Part C | SE-O | 7.0 ft.lbs. | 177° F. | 50 |

The soluble rubbers used in Example 18 are diene rubbers such as high-cis polybutadiene rubbers having a cis-isomer content of about 30% to 98% and having a second order transition temperature, Tg, of from about −50° C. to −105° C. as determined by ASTM Test D-746-52T. These rubbers are available, for example, as Diene 35 and 55 from the Firestone Rubber Company of Akron, Ohio and as Polysar Taktene 1202 from the Polymer Corporation of Sarnia, Ontario. Other soluble diene rubbers include copolymers of conjugated 1,3-bitadiene with up to equal amounts by weight of one or more copolymerizable monoethylenically unsaturated monomers such as monovinylidene aromatic monomers, e.g., styrene, and monoethylenically unsaturated nitriles, e.g., acrylonitrile. The preferred diene copolymer rubbers are those having a second order transition temperature, Tg, range of from about −20° C. to −70° C.

The polychloroprene rubbers contained in an emulsion and used in the preparing the polyblends of the present invention are readily available in the form of latices. These latices are commercially available as Neoprene Latices from the E. I. duPont de Nemours & Company, Wilmington, Del. and are described in the reference "Neoprene Latex", by J. C. Carl published by duPont in 1962. These latices have a rubber solids content of about 34.5% to 60%, a pH of about 9 to 13, latex specific gravity of about 1.10 to 1.15, rubber specific gravity of 1.23 to 1.42, latex viscosity of 16 to 400 cps. (Brookfield viscosity) and the latices are stabilized by anionic or cationic emulsifiers. The rubbers contained in the latices are cross-linked and are a medium to high gel types, are viscous, having a Mooney viscosity of at least about 200 (MS-2½ min. 212° F.). The rubber particle size distribution of such latices can be varied so as to give the selected weight average particle size range desired and disclosed in this invention. Such Neoprene latices are also commercially available from the Petro-Tex Chemical Corporation of Houston, Tex.

Other monomers may be interpolymerized with the monovinylidene aromatic monomers and the ethylenically unsaturated nitriles of the rigid phase already described. The described monomers can be replaced by such other monomers, e.g., 1 to 25% by weight, consistent with maintaining the properties of the polyblend as already described. Exemplary of such other monomers are conjugated 1,3-dienes, e.g., butadiene isoprene, etc.; alpha- or beta-unsaturated monobasic acids or derivatives thereof, e.g., acrylic acid, methyl acrylate, ethyl acrylate, butyl acrylate, 2-ethylhexyl acrylate, methacrylic acid and the corresponding esters thereof; acrylamide, methacrylamide, vinylidene chloride, vinylidene bromide, etc.; vinyl esters such as vinyl acetate, vinyl propionate, etc., dialkyl maleates or fumarates such as dimethyl maleate, diethyl maleate, dibutyl maleate, the corresponding fumarates, etc. The above described other monomers may also be interpolymerized with the chloroprene of the rubber phase either as comonomers or grafted monomers on the polychloroprene rubber.

EXAMPLES 19 – 23

Polyblend Proportions Tested

The grafted chloroprene latex of Example 6 having about 35% solids was coagulated with aluminum sulfate and the solid recovered as a crumb and dried. The solids analyze 75% grafted rubber and 26% SAN copolymer as the rigid phase. The rubber crumb is 50% chloroprene rubber and has 48% by weight of grafted SAN contributing 24% SAN copolymer to the crumb. The rubber has a particle size of 0.12 microns. The grafted rubber latex of Example 13 having a rubber particle size of 0.5 microns is coagulated with aluminum sulfate, recovered as a crumb and dried. The solids analyze 50% by weight rubber, having a graft level of 15% SAN contributing 7.5% by weight of SAN to the crumb along with 42.5% SAN copolymer as the rigid phase.

The SAN latex of Example 3 is coagulated with aluminum sulfate and the solids recovered as a free flowing SAN powdered polymer. The grafted rubber crumb of Examples 6 and 13 and the SAN polymer of Example 3 are dry blended with $Sb_2O_3$ to form admixtures and melt blended at 425° F. to a uniform polyblend. The polyblends are molded into specimens and tested for self-extinguishing properties and impact strength. The proportions of the above described materials for each polyblend are tabulated below along with the test results.

EXAMPLES

| Admixture | Proportions by Weight % | | | | |
|---|---|---|---|---|---|
| | 19 | 20 | 21 | 22 | 23 |
| Ex. 6 Crumb | 24.0 | 32.0 | 36.8 | 64.0 | 64.0 |
| Ex. 6 Rubber | 12.0 | 16.0 | 18.4 | 32.0 | 32.0 |
| Ex. 6 Graft SAN | 5.8 | 7.7 | 6.8 | 15.4 | 15.4 |
| Ex. 6 SAN | 6.2 | 8.3 | 11.6 | 16.6 | 16.6 |
| Ex. 13 Crumb | 6.0 | 8.0 | 9.2 | 16.0 | 16.0 |
| Ex. 13 Rubber | 3.0 | 4.0 | 4.6 | 8.0 | 8.0 |
| Ex. 13 Graft SAN | 0.5 | 0.6 | 0.7 | 1.2 | 1.2 |
| Ex. 13 SAN | 2.5 | 3.4 | 3.9 | 6.8 | 6.8 |
| Ex. 3 SAN | 55.0 | 51.0 | 44.0 | 16.0 | 19.0 |
| Total Rubber | 15.0 | 20.0 | 23.0 | 40.0 | 40.0 |
| Total SAN | 70.0 | 71.0 | 67.0 | 56.0 | 59.0 |
| $Sb_2O_3$ | 15.0 | 9.0 | 10.0 | 4.0 | 1.0 |
| UL 94 Test | SE-O[1] | SE-O[1] | SE-O[2] | SE-O[1] | SE-O[3] |
| Impact Strength ft.lbs./sq.ft. | 1.0 | 1.5 | 1.8 | 3.2 | 3.6 |

[1]UL 94 with ⅛" (0.125") thick test specimen.
[2]UL 94 with 0.07" thick specimen.
[3]UL 94 with 0.250" thick specimen.

It is evident from the test data above and from the examples previously described that the grafted chloroprene rubber provides good impact over the range of 15 to 40% by weight and provides self-extinguishing properties in combination with $Sb_2O_3$ over a range of 1 to 15% by weight.

EXAMPLE 24

The polymeric polyblend of Example 21 containing 30 parts of chloroprene rubber is admixed with an SAN polymer of Exmple 3 in a ratio of about 77/23 by weight to provide an admixture containing about 23 percent by weight of chloroprene rubber. 95 Parts of the admixture is further admixed and melt colloided uniformly with an additional 5 parts of $Sb_2O_3$ in an extruder at 425° F., extruded into strands, cooled and cut into pellets. Samples are injection molded and tested for self-extinguishing properties by the UL 94 Test. The extruder used has a 2½ inch diameter single screw with length to diameter (L/D) of 24:1 and a compression ratio of 3.5 to 1 and back pressure of 2500 psi. The pellets were screw injection molded at 500° F. into formed samples using a mold temperature of 130° F. The polymeric polyblend is found to be self-extinguishing having a value of SE-O and desirable impact strength of 2.0 ft. lbs./in. showing the grafted chloroprene rubber to be highly effective, in combination with $Sb_2O_3$, in providing self-extinguishing properties and impact strength to the polyblends of this invention. The SAN polymer of Example 3 is recovered from the latex by coagulation, washing and drying. The polymer is molded and tested by UL 94 test procedures. The polymer was not self-extinguishing.

EXAMPLES 25 – 31

Metal Plating

The grafted chloroprene polyblends used in the present invention and various commercially available polymers are injection molded into plaques 0.100 × 3 inch × 4 inches according to the general procedures used in Example 24. The samples used in the metal plating tests are summarized in Table I below:

TABLE I

SUMMARY OF SAMPLES USED IN METAL PLATING TESTS

| Example | Polymer(1) | % Grafted Chloroprene(2) | % Grafted Butadiene(2) | % SAN | % $Sb_2O_3$ |
|---|---|---|---|---|---|
| 25 | SAN | — | — | 100 | — |
| 26 | ABS | — | 23 | 77 | — |
| 27 | ACS | 30 | — | 65 | 5 |
| 28 | ACS | 30 | — | 65 | 5 |
| 29 | ACS | 20 | 2.5 | 68.5 | 9 |
| 30 | ACS | 20 | 2.5 | 68.5 | 9 |
| 31 | ACS | 20 | 2.5 | 68.5 | 9 |
| 32 | ACS | 23 | — | 72 | 5 |

(1)SAN - styrene/acrylonitrile copolymer.
ABS - butadiene grafted with acrylonitrile and styrene blended with SAN.
ACS - chloroprene grafted with acrylonitrile and styrene blended with SAN.
(2)grafted with styrene/acrylonitrile.

The SAN used in Example 25 is a copolymer of styrene and acrylonitrile containing about 70% by weight of styrene and about 30% by weight of acrylonitrile. The ABS used in Example 26 is a commercially available material described in Example 1 above. The ACS used in Example 32 is the ACS used in Example 2 above. Examples 29 and 31 also contain 2.5% by weight of grafted butadiene rubber of the type used in Example 18. The chloroprene rubber component in Example 28 is a mixture of large and small particle size rubbers as described above.

The plaques are metal plated according to the general procedures described below by first applying an electroless coating for conductivity followed by electroplating with the desired metal. The procedure described below is representative of the methods used in the metal plating of plastics and is not to be considered as a part of this invention.

Plating Procedure

A. ELECTROLESS PLATING

Commercial materials are used and are available from MacDermid, Inc. 526 Huntington Avenue, Waterbury, Conn., and Enthone, Inc. West Haven, Conn. Most commercial processes are similar. The following steps are used:

1. Alkaline Wash — 2 min., 140° F. using e.g. Enplate PL-452, alkaline salt cleaner, 5 oz./gal. $H_2O$, from Enthone, Inc., removes oils and foreign materials. Operate according to data sheet for Enplate PL-452.
2. Cold Water Rinse
3. Acid Dip — 1 min., room temp. e.g. Metex Acid Salt M-629, mixture of dry acid salts, activators and surface active agents, 1.5 lbs./gal. $H_2O$ from MacDermid, Inc., neutralizes alkaline wash.
4. Cold Water Rinse 5. Acid Cleaning — 1 min., 135° F., e.g. MACuplex Acid Cleaner, liquid used as received, from MacDermid, Inc. surface cleaning agent. Operate by Bulletin for MACuplex, 6. Chromic-Sulfuric Acid Etch — 9 min., 150° F., e.g. MACuplex XL-43 from MacDermid, Inc., liquid solution used as received, sulfuric acid swells rubber phase, chromic acid oxidizes and dissolves.

7. Cold Water Rinse

8. Etchant Kill and Rinse — 1.5 min., room temp., e.g. MACplex XL-44 from MacDermid, Inc. 1 oz./gal. $H_2O$.

9. Cold Water Rinse

10. Activation — 4 min., 85° F., e.g. MACuplex Activator B from MacDermid, Inc., 1 part by vol. to 19 parts of distilled or deionized $H_2O$ or 6.4 fluid oz./gal. $H_2O$.

11. Cold Water Rinse

12. Accelerate — 0.5 min., room temp., e.g. MACuplex Accelerator from MacDermid, Inc., 3.8 fluid oz./gal. of deionized or dist. $H_2O$.

13. Cold Water Rinse

14. Electroless Chemical Nickel Plating — 5 min., 145° F. using a passivated stainless steel tank charge 20 fluid parts of MACuplex Nickel Concentrate, 4 of MACuplex Nickel Reducer Concentrate (MacDermid, Inc.) and 76 of deionized or dist. $H_2O$ containing 17 cc of 66° Baume reagent sulfuric acid per gal. of $H_2O$. Operate according to Bulletin PL-306 of MacDermid, Inc.

15. Cold Water Rinse

16. Acid Dip — see Step (3).

17. Cold Water Dip

B. ELECTROPLATING

18. Semi-Bright Nickel Plating — 5 min., 133° F., 3 volts, Udylite N3E semi-bright nickel plating process is used according to Bulletin No. NP-N3E, Udylite Corp., Detroit, Mich.

19. Cold Water Rinse

20. Acid Dip — see Step (3).

21. Cold Water Rinse

22. Bright Acid Copper Plating — 40 min., 79° F., 35 amp./ft.$^2$, Udylite UBAC No. 1 copper plating process is used according to Bulletin No. CUP-UBAC-1, Udylite Corp., Detroit, Mich.

23. Cold Water Rinse

24. Acid Dip — see Step (3).

25. Cold Water Dip

26. Bright Nickel Plating — 13 min., 133° F., 40 amp./ft.$^2$, Udylite Bright Nickel Process No. 66 is used according to Bulletin No. NP-66, Udylite Corp., Detroit, Mich.

27. Cold Water Rinse

28. Chromium Plating — 2.5 min., 120° F., 150 amp./ft.$^2$, Udylite chromium plating process is used according to Bulletin CRP-K-50, Udylite Corp., Detroit, Mich.

29. Cold Water Rinse

30. Hot Water Rinse

After electroplating, the plated specimens from Table I above are inspected for surface defects such as cracks, burrs, pitted surfaces, roughness and quality of plating. The samples are evaluated for adhesion of the electroplated metal to the polymer substrate using an Instron Peel Tester.

Thermal cycling tests were run on the plated samples by exposing them to 10 cycles at the temperatures indicated below for 1 hour at each temperature.

| THERMAL CYCLE PROCEDURE |
| --- |
| 1st 3 cycles - 180° F. to −20° F. |
| 2nd 3 cycles - 190° F. to −30° F. |
| 7th & 8th cycles - 200° F. to −40° F. |
| 9th & 10th cycles - 210° F. to −50° F. |

After 1 hour at a given temperature the samples are allowed to return to room temperature before going on to the next phase in the temperature cycle. The results of these tests are tabulated in Table II below.

TABLE II

TESTS ON ELECTROPLATED POLYMER SAMPLES

| Example | Composition | Peel Strength lbs./in. | Thermal Stress Resistance(3) |
| --- | --- | --- | --- |
| 25 | SAN | <0.5 | not tested |
| 26 | ABS | 0.8 | good |
| 27 | ACS | 2 to 6 | poor (1 cycle) |
| 28 | ACS | 1.15 | poor (1 cycle) |
| 29 | ACS | 0.9 | fair (7 cycles) |
| 30(1) | ACS | 1.25 | good |
| 31(2) | ACS | 1.20 | good |
| 32 | ACS | — | fair (5 cycles) |

(1) Sample contains 1% ethylene bis stearamide lubricant.
(2) Sample contains 3% ethylene bis stearamide lubricant.
(3) Unless otherwise indicated, as samples passed ten (10) cycles. Cycle noted is where failure occurred.

All the plated samples have a good appearance. The adhesion tests indicate that the metal coating has substantially no adhesion to the SAN polymer. The adhesion for the commercially available ABS material was about 0.8 lbs./in. The adhesion for the ACS samples is in the range of 0.9 to 2 lbs./in. Example 27 exhibited marked variations in the peel test and only went 1 cycle in the thermal stress test. Examination of the sample indicated that the polymeric material was not thoroughly blended. Example 28 showed good peel strength but poor thermal stress resistance, possibly because of a defect in sample preparation. The ABS sample (Example 26) and the ACS samples (Examples 29 to 32) exhibited good peel strength and fair to good thermal stress resistance. Thermal stress was best for those ACS samples which contained a small amount of grafted butadiene rubber. All of the ACS samples have utility where severe thermal cycling resistance is not required. Where severe thermal cycling is a factor it is preferred to use ACS polyblends which contain minor amounts of grafted butadiene rubber.

EXAMPLE 33

The metal plating of Examples 25 and 32 are repeated wherein two specimens of each polymer are held back to back with tape and plated. Only one side of each specimen receives plating which is common for industrial metal plated plastic articles. The specimens were separated and subjected to the self-extinguishing UL 94 Test. The SAN polymer specimens failed the test and are not self-extinguishing. The grafted chloroprene polyblend specimens of the present invention were found to have values of SE-O and are self-extinguishing metal plated polymeric polyblend articles.

Smoke evolution tests were carried out on the chloroprene based polyblends used to prepare the metal plated articles of the present invention and on three commercially available polymers which did not contain any grafted polychloroprene rubber. The smoke evolution tests were carried out using an AMINCO-NBS Smoke Density Chamber, Catalog No. 4-5800-A available from American Instrument Company, Silver Springs, Md. The procedure used is that set in Instruction 941-A Bulletin (November 1971) of the American Instrument Company. Both plated and unplated samples, which are 3 inches × 3 inches square and of various thicknesses were tested. The plated samples are plated on all sides so that no unplated areas are exposed to the ignition source. The thickness of the metal plating is approximately 2 mils thick. The results of the smoke tests are tabulated in Table III below.

should conform to shapes and forms that can be plated effectively as understood by those skilled in the art. It is generally preferred, e.g., that the formed part for plating have good surface finish enabling high gloss plating. Deep recesses and V-shaped grooves are difficult to plate. Sharp edges should be eliminated from the designed form with general radius provided to insure even plating, etc. The formed article should be formed with a minimum of residual stress to insure plating stability on the formed part. Many platers anneal the parts prior to plating to provide dimensional stability during and after plating.

What is claimed is:

1. A metal plated article of manufacture which exhib-

TABLE III

SMOKE EVOLUTION TEST

| Polymer (1) | Sample Thickness | time minutes → | | | | | | | | | |
|---|---|---|---|---|---|---|---|---|---|---|---|
| | | 1 | 2 | 4 | 5 | 6 | 8 | 10 | 12 | 16 | 20 |
| ABS | .033" | 285 | 420 | | | | | | | | |
| ABS (Plated) | .100" | 0 | 0 | 2 | | 3 | 13 | 505> | 900 | | |
| ACS | .033" | 400 | 476 | | | | | | | | |
| ACS (Plated) | .100" | 0 | 0 | 0 | | | 29 | 47 | 57 | 95 | 118 |
| Fire Retardant ABS | .033" | 550 | 850 | | | | | | | | |
| Fire Retardant ABS (Plated) | .100" | 0 | 0 | 138 | | 369 | | 833 | | | |
| Noryl (Plated) | .100" | 0 | 5 | 597> | 900 | | | | | | |

(1) The ABS polymer and the ACS polymer are those used in Examples 26 and 29, respectively. The fire retardant ABS used is Cycolac KJB from Borg-Warner Corporation. The Noryl is commercially available from General Electric Company.

The data in Table III above clearly indicate superior smoke evolution properties of the plated articles of the present invention. The ACS article of the present invention has a smoke value of only 118 after 20 minutes. This value corresponds to a light transmittancy of about 13%. On the other hand, regular conventional plated ABS has a smoke value greater than 900 after 12 minutes. Fire retardant ABS material has a smoke value of 833 after 10 minutes. Both values correspond to a light transmittancy of less than 0.1%. The unplated ABS and ACS samples have approximately the same smoke values. These data indicate that in addition to having improved flame retardancy, the metal plated compositions of the present invention have surprisingly low smoke evolution.

Other Modifications

Various modifications of metal plating methods of the industry may be used to manufacture the metal plated article. The types of metals that are to be plated can be varied according to industrial practice and end use. The plating system already described provides a final face plating of chromium. Various face platings can be plated with copper, nickel and chromium being described. Other metals may be used, e.g. silver, gold, cadmium, zinc, tin and the like. Chromium is the most preferred because of its blue-silver color and its abrasion resistance, however, the other metals can be used for corrosion resistance and decorative properties.

The polymer polyblend article to be plated may be a formed article, e.g., injection moldings, extruded profiles, vacuum formed moldings, blow moldings, press moldings, etc. Formed articles for plating purposes its low smoke evolution under flaming conditions which article comprises a molded thermoplastic article having a metal plated exterior surface wherein the metal plating is approximately 2 mils thick and wherein the metal used is selected from the group consisting of nickel, copper and chromium and wherein the thermoplastic article is molded from a polyblend composition comprising:

A. a polymer of a monovinylidene aromatic monomer and an ethylenically unsaturated nitrile monomer wherein the ethylenically unsaturated nitrile monomer moiety constitutes from 20% to about 70% by weight of the polymer;

B. from 15 to 40% by weight, based on the total weight of the polyblend, of a crosslinked polychloroprene rubber having a Mooney viscosity of at least 200 (MS-2½ min., 212° F.), which is grafted with:

1. at least one monovinylidene aromatic monomer; and 2. an ethylenically unsaturated nitrile monomer; wherein the ethylenically unsaturated nitrile monomer moiety constitutes from 20% to about 70% by weight of the grafted polymer; wherein the percent graft of aromatic monomer and nitrile monomer onto the polychloroprene rubber is in the range of from 10 to 100% by weight, based on the weight of the polychloroprene rubber;

C. from 5 to 10% by weight, based on the total weight of the polyblend of an inorganic compound selected from the group consisting of $Sb_2O_3$, $Bi_2O_3$, $MoO_3$, $SnO_2$, $WO_3$, and mixtures of the same; and D. from 0.5 to 5.0% by weight of a butadiene rubber said butadiene rubber being grafted with
  1. at least one monovinylidene aromatic monomer, and
  2. an ethylenically unsaturated nitrile monomer, wherein the total amount of polymer formed from the vinylidene aromatic monomer and the unsaturated nitrile monomer in the polyblend composition is in the range of from 45 to 84% by weight, based on the total weight of the polyblend.

2. The article of claim 1 wherein at least one said monovinylidene aromatic monomer is selected from the group consisting of styrene, alphamethylstyrene, monochlorostyrene, monobromostyrene, aralkylstyrenes, alphaalkylstyrenes, alphahalostyrenes, arhalostyrenes and mixtures of the same.

3. The article of claim 1 wherein said ethylenically unsaturated nitrile is selected from the group consisting of acrylonitrile, methacrylonitrile, ethacrylonitrile and mixtures of the same.

4. The article of claim 1 which contains from 5 to 10% by weight of $Sb_2O_3$.

5. The article of claim 1 wherein said polyblend having interpolymerized therewith from 1 to 25% by weight of a monomer selected from the group consisting of acrylic acid, methyl acrylate, ethyl acrylate, butyl acrylatne, 2-ethylhexyl acrylate, methacrylic acid, methyl methacrylate, ethyl methacrylate, butyl methacrylate, 2-ethylhexyl methacrylate and mixtures thereof.

* * * * *